United States Patent
Dietz et al.

(10) Patent No.: US 7,378,991 B2
(45) Date of Patent: May 27, 2008

(54) CONDENSED KEYBOARD FOR ELECTRONIC DEVICES

(75) Inventors: Timothy A. Dietz, Austin, TX (US); Lane T. Holloway, Pflugerville, TX (US); David C. Tjonpiangi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 11/278,554

(22) Filed: Apr. 4, 2006

(65) Prior Publication Data

US 2007/0247337 A1    Oct. 25, 2007

(51) Int. Cl.
*H03K 17/94*    (2006.01)

(52) U.S. Cl. .................. 341/22; 200/5 A; 200/518; 400/485; 400/489; 345/169; 379/433.07

(58) Field of Classification Search .................. 341/22; 200/5 A, 518; 400/485, 489; 345/169; 379/433.07
See application file for complete search history.

(56) References Cited

U.S. PATENT DOCUMENTS

| | | |
|---|---|---|
| 4,029,915 A | 6/1977 | Ojima |
| 4,256,931 A * | 3/1981 | Palisek .................. 200/5 A |
| 4,467,321 A | 8/1984 | Volnak |
| 4,490,056 A | 12/1984 | Whitaker |
| 4,661,005 A | 4/1987 | Lahr |
| 4,791,408 A | 12/1988 | Heusinkveld |
| 4,833,446 A | 5/1989 | Eilam et al. |
| 4,849,732 A | 7/1989 | Dolenc |
| 4,868,913 A | 9/1989 | Tse-Kai |
| 4,882,581 A | 11/1989 | Inobe et al. |
| 4,913,573 A | 4/1990 | Retter |
| 4,987,275 A * | 1/1991 | Miller et al. ................. 200/5 A |
| 5,087,910 A | 2/1992 | Guyot-Sionnest |
| 5,137,384 A | 8/1992 | Spencer et al. |

(Continued)

FOREIGN PATENT DOCUMENTS

DE    100 17 838 A1    2/2001

(Continued)

OTHER PUBLICATIONS

ISR including PCT transmittal & Written Opinion, From the International Searching Authority, mailed Jun. 5, 2007, Applicant: International Business Machines Corporation, International Application No. PCT/EP2007/052186, pp. -9.

*Primary Examiner*—Timothy Edwards, Jr.
(74) *Attorney, Agent, or Firm*—Gregory M. Doudnikoff; Schubert Osterrieder & Nickelson PLLC

(57) ABSTRACT

Methods, apparatuses, systems, and media for generating characters for electronic devices using condensed keyboards are disclosed. Embodiments comprise a method of manipulating a set of keys adapted to be manipulated using fingers of a left hand and a right hand of a user, each of the keys capable of generating multiple characters. A variation of the method includes using one or more keys adapted to be used by thumbs of the user to generate other characters and/or control characters. Other embodiments comprise keyboards, apparatuses, and portable electronic devices that comprise two sets of keys for manipulation and desired character generation. The keyboards generally have four or more keys for each hand, and the keyboards may be located on the back and/or sides of portable the systems.

6 Claims, 11 Drawing Sheets

U.S. PATENT DOCUMENTS

| | | |
|---|---|---|
| 5,281,966 A | 1/1994 | Walsh |
| 5,332,322 A | 7/1994 | Gambaro |
| 5,410,333 A | 4/1995 | Conway |
| 5,481,263 A | 1/1996 | Choi |
| 5,486,058 A | 1/1996 | Allen |
| 5,497,151 A | 3/1996 | Dombroski |
| 5,553,953 A | 9/1996 | Herman et al. |
| 5,612,691 A | 3/1997 | Murmann et al. |
| 5,796,056 A * | 8/1998 | Bredow et al. .............. 200/5 A |
| 5,812,117 A | 9/1998 | Moon |
| 5,841,374 A | 11/1998 | Abraham |
| 5,861,823 A * | 1/1999 | Strauch et al. ................. 341/22 |
| 5,949,643 A | 9/1999 | Batio |
| 6,053,647 A | 4/2000 | Parkinson |
| 6,241,406 B1 | 6/2001 | Yan |
| 6,297,752 B1 * | 10/2001 | Ni ............................... 341/22 |
| 6,370,018 B1 | 4/2002 | Miller, Jr. et al. |
| 6,386,773 B1 | 5/2002 | Mathias |
| 6,528,741 B2 | 3/2003 | Walker |
| 6,541,715 B2 * | 4/2003 | Swanson .................... 200/5 A |
| 6,712,533 B2 | 3/2004 | Chen |
| 6,789,967 B1 * | 9/2004 | Forester ...................... 400/489 |
| 6,822,852 B2 | 11/2004 | Von Novak |
| 6,869,239 B2 | 3/2005 | Morris |
| 6,909,424 B2 * | 6/2005 | Liebenow et al. .......... 345/169 |
| 6,952,173 B2 | 10/2005 | Miller |
| 2005/0104855 A1 * | 5/2005 | Grossmeyer ................ 345/169 |

FOREIGN PATENT DOCUMENTS

| | | |
|---|---|---|
| EP | 1 376 318 A1 | 1/2004 |
| GB | 2 266 274 A | 10/1993 |

* cited by examiner

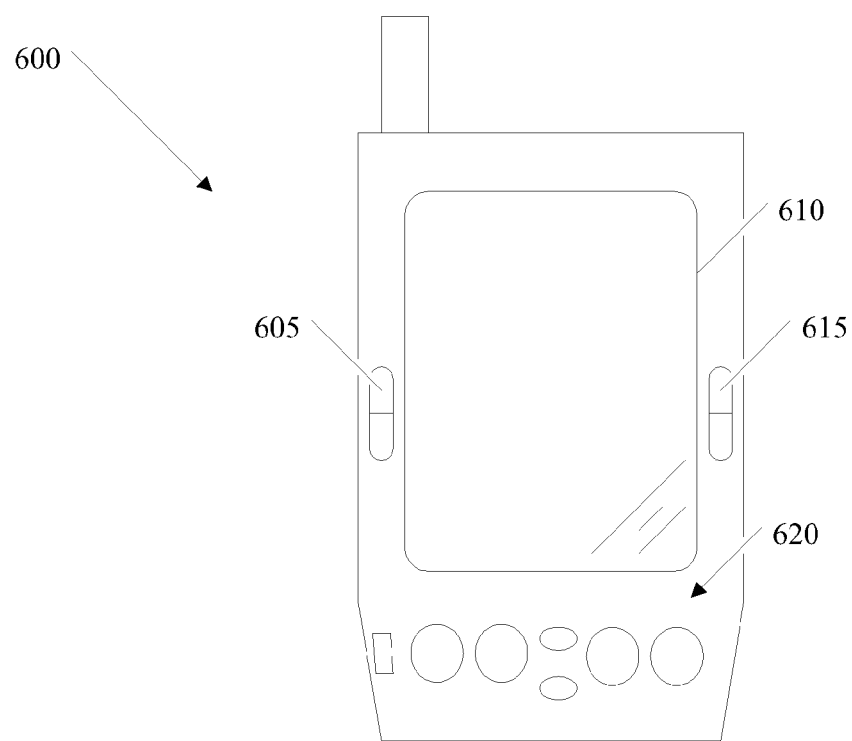
FIG 6A
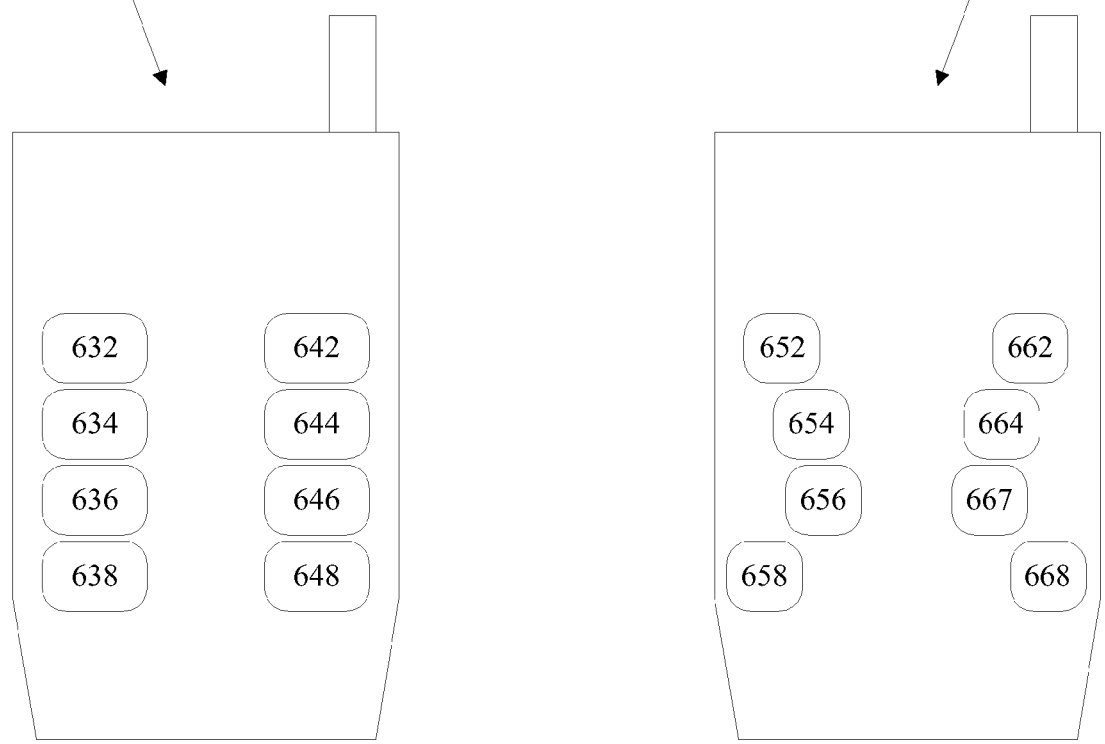
FIG 6B
FIG 6C

CONDENSED KEYBOARD FOR ELECTRONIC DEVICES

FIELD

The present invention generally relates to the field of keyboards for electronic devices. More particularly, the present invention relates to apparatuses, systems, methods, and media for using condensed keyboards that generate multiple characters with relatively few keys.

BACKGROUND

Today portable electronic devices are ubiquitous. Businesspeople rely on laptop and notebook computers, personal digital assistants (PDAs), and other portable electronic organizers to write memorandums, create letters, edit spreadsheets, databases, and other documents, manage their busy schedules, and store contact information. Mobile and cellular telephones are commonplace, being used by businesspeople to make business calls to clients, customers, and other businesspeople, by family members to remain in contact with each other, and friends to chat amongst themselves. Adults and children alike enjoy music from their portable music players. Additionally, people increasingly use laptop computers, PDAs, and even cellular telephones to access the Internet.

A common feature, or characteristic, that more and more people demand from these portable electronic devices is convenience of size, the smaller the better. People both want and need smaller and smaller devices. People do not enjoy packing and lugging around heavy and bulky electronic devices. Consequently, some of the most popular and most sought after portable electronic devices are those that are feature-rich yet compact. However, as manufacturers reduce the sizes of these electronic devices, they simultaneously reduce the ability for users to interact with the devices. For example, as manufacturers reduce the size of notebook and laptop computers they still must design keyboards that are sufficiently large in order for users with average size hands to be able to type on them.

Manufacturers of portable electronic devices have proposed numerous reduced-size keyboard formats that have been resoundingly rejected by users for various reasons. One example has been the chording keyboard. Chording keyboards have reduced numbers of keys and produce alphanumeric characters by using key combinations. While the chording keyboard technology has great promise in terms of size and speed, people have not migrated to chording because of the steep learning curve and difficult key combinations that must be remembered. Alternatively, some manufacturers produce very small keyboards that produce characters when the users touch tiny keys with a stylus. While these keyboards are small, entering large amounts of text is slow and tedious. Essentially, users are reduced to single-key "hunt-and-peck" typists. Some people may be able to enter text at rates of 10 to 20 words per minute using these keyboards. However, people that have conventional typing skills are used to entering text at rates between 50 to 120 words per minute find these keyboards too tedious and time consuming.

Another keyboard manufacturers have tried is the chiclet, or rubber-keyed, keyboard. Manufacturers like rubber-keyed keyboards because they are relatively inexpensive to manufacture. However, portable devices today that employ such keyboards typically implement them as tiny keyboards, prohibiting users from striking the keys in a rapid manner. Again, users are relegated to hunt-and-peck, or two-fingered, typing. Users with touch typing skills find these keyboards only slightly better than stylus keyboards.

Another type of keyboard, which happens to be a popular choice among cellular telephone manufacturers, is the T-9 keyboard. Similar to the buttons on a conventional telephone, this keyboard groups multiple letters onto single keys. For example the letters A, B, and C may be on one key, while D, E, and F are on another key. While this keyboard has fewer keys than full-sized QWERTY keyboards, and users generally find entering text relatively easy to learn and easy to do, text input still remains much slower than touch typing with a full-sized QWERTY keyboard. One reason for this is that users generally must strike a key 2 to 3 times to select the desired character. Some manufacturers improve the speed of using T-9 keyboards by utilizing computer algorithms that predict the words users are entering. While such algorithms have dramatically increased the rate of entering text with T-9 keyboards, the algorithms nonetheless fall short of the speed attainable by users employing touch typing with conventional full-sized keyboards.

Given the keyboard apparatuses and devices currently available for entering alphanumeric text into electronic devices, users need alternative keyboards that are more compact yet still enable them to use their touch typing skills. Such keyboard apparatuses and devices should allow rapid input of information, where several fingers can press keys in rapid succession to quickly enter large amounts of data. This invention addresses these issues.

SUMMARY

The problems identified above are in large part addressed by apparatuses, systems, methods, and media of condensed keyboards for electronic devices. One embodiment comprises a method of using a first row of keys adapted to be used by fingers of a left hand and using a second row of keys adapted to be used by fingers of a right hand, with each of the keys capable of generating multiple characters. The method may include using one or more keys adapted to be used by thumbs of the user to generate additional characters and/or control characters. A variation of the method involves displaying visual cues on a screen of the electronic devices to aid users in operating the keyboards.

Another embodiment comprises a keyboard that monitors two sets of keys, one for each hand, for manipulation and desired character generation. The keyboard generally has four or more keys for each hand, and the keyboard may be located on the back and/or sides of a portable electronic device. One or several of the keys may generate multiple characters, depending on how the user manipulates the key while depressing it. Some embodiments have keys relatively square keys, with sides having dimensions measuring between 0.5 inch and 1 inch. Some embodiments have rows of keys measuring between 2 inches and 5 inches in length.

Other embodiments comprise portable electronic devices having keyboards with two sets of keys, one for each hand, for manipulation and desired character generation. The devices generally have four or more keys for each hand and may be located on the back and/or sides of portable the systems. One or several of the keys may generate multiple characters, depending on how the user manipulates the keys while depressing them. A further system embodiment may display cues or help information on a display screen of the system, assisting users in typing with the keys since the users may be unable to easily observe their fingers. That is to say, some embodiments may provide support for people with no touch-typing skills and accommodate key configurations on the back of devices with an embodiment keyboard.

A further embodiment comprises a configurable keyboard, wherein an operator of a device containing the keyboard may specify the mapping of the keys to the characters they generate. This may accommodate users familiar with alternative keyboard mapping formats, such as Dvorak keyboards, instead of the aforementioned QWERTY keyboards. Software in the device allows for easy mapping of new configuration or easy selection of existing ones.

An even further embodiment comprises an apparatus to perform operations allowing a keyboard engine to monitor the operation of a condensed keyboard and generate characters in response to the operation. Generally, components of the various embodiments c comprise an actuation determiner, a character generator, an alternate character mapper, and a display mapper. The components may monitor two sets or rows of keys for movement and/or depression, detecting depression of individual keys, generating letters and numbers based upon the movement and depression of the keys, and displaying the letters and numbers on a display for an electronic device.

BRIEF DESCRIPTION OF THE DRAWINGS

Other objects and advantages of the invention will become apparent upon reading the following detailed description and upon reference to the accompanying drawings in which, like references may indicate similar elements:

FIGS. 6A-6C depict a PDA with two example compact keyboard arrangements on the backside;

DETAILED DESCRIPTION OF EMBODIMENTS

Figure 1A:
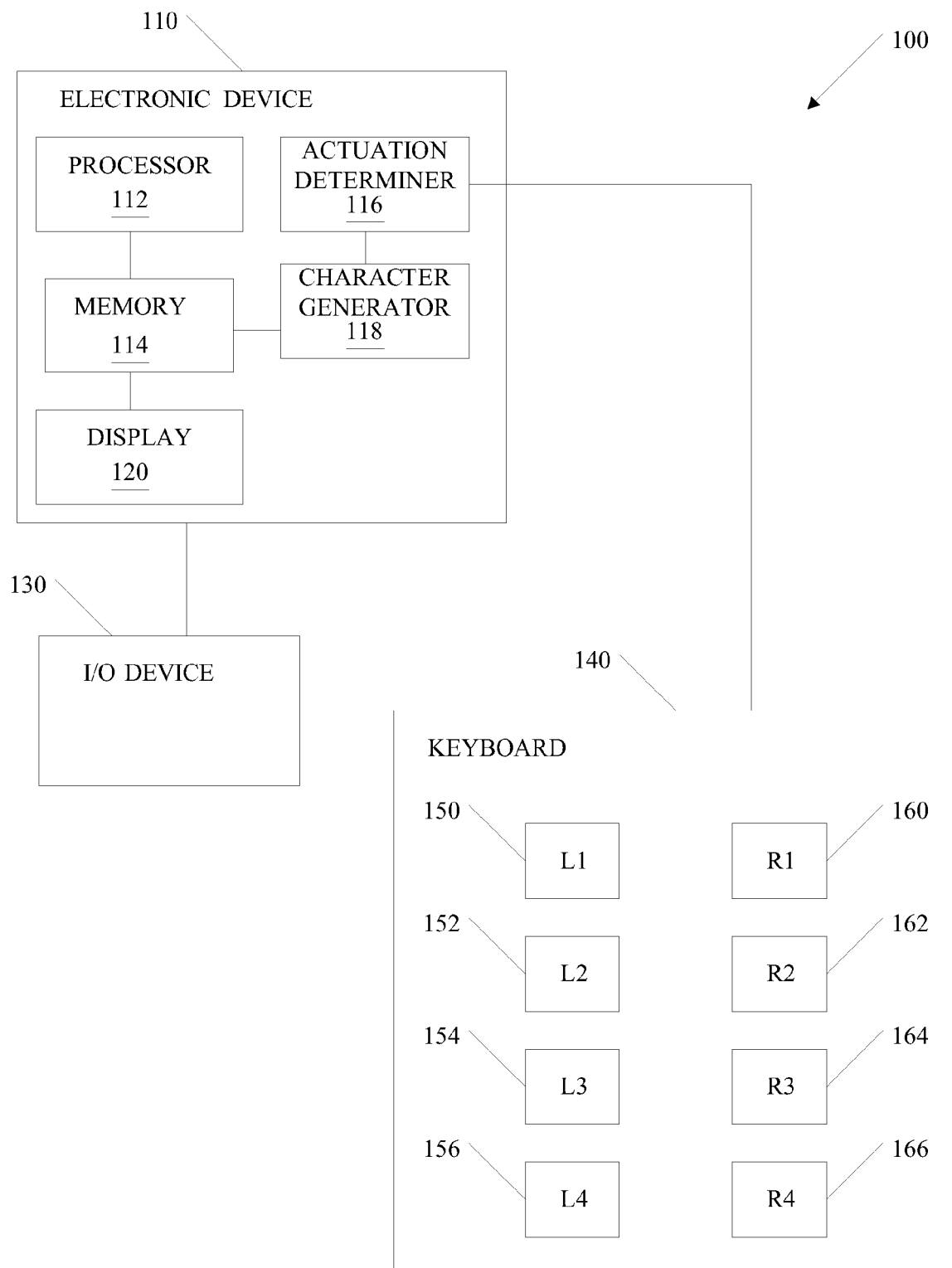
FIG. 1A shows a system diagram of an electronic device employing a compact keyboard for entering data.

The following is a detailed description of example embodiments of the invention depicted in the accompanying drawings. The example embodiments are in such detail as to clearly communicate the invention. However, the amount of detail offered is not intended to limit the anticipated variation of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, apparatuses, systems, methods, and media for utilizing condensed keyboards by electronic devices are disclosed. New techniques for generating a plurality of characters from single keys, from numerous keys arranged to form a condensed or compact keyboard, are discussed. Embodiments comprise a method of sensing positions and depressions of keys and generating characters to be used by associated electronic devices. In these embodiments, keyboard apparatus software and/or hardware may monitor the keyboard conditions, sense when keys are activated, and generate various characters based on the conditions of the keys when they are activated. In some embodiments, the keyboard apparatus may comprise sliding keys positioned on the backside of a portable electronic device. In other embodiments, the keyboard apparatus may comprise fixed keys that generate characters based upon key pressure and/or key deflection. In further embodiments, the keyboard apparatus may use other technologies to sense key character generation, such as capacitance, resistance, inductance, optics, and the like.

The systems employing the condensed keyboards may vary in different embodiments. In some embodiments, the condensed keyboards may be located on the portable electronic device. In these embodiments, the keyboards may be located on the backsides of the devices, so that users may comfortably enter text while holding the devices. The types of systems for these embodiments may be PDAs and cellular telephones to name only a few. In other embodiments the compact keyboards may be located on front facial surfaces of the portable electronic devices. An example system would be a small portable computing device or electronic organizer. In these embodiments the keys of the keyboard may be arranged in a single straight row of keys, similar to the home row keys of a conventional QWERTY keyboard. Also in these embodiments the keys may be arranged in a more ergonomic manner, such as in a slight U-shape to relieve stress on the wrists of users.

While portions of the following detailed discussion describe many embodiments comprising new techniques for generating a plurality of characters from single keys arranged in condensed keyboards on the backsides of portable electronic devices, a person of ordinary skill in the art will recognize that the following invention may be used to generate characters for a variety of different electronic devices. For example, while one embodiment may comprise a keyboard coupled to a portable PDA, other embodiments may comprise a keyboard coupled to a desktop computer. All methods of practicing the invention are interchangeable. Further, while embodiments discuss using sliding and rotating keys to generate various characters, one of ordinary skill in the art will recognize that keys may employ an almost endless variation of mechanical and/or electronic sensing technologies, such as optical, pressure, and strain sensing technologies.

Even further, while many embodiments discuss generating alphanumeric characters, such as numbers and letters of the English alphabet, embodiments may also generate letters, punctuation characters, numbers, and characters for languages other than English. As examples, some embodiments may generate Russian language characters in response to keystrokes while other embodiments may generate Chinese figures. Additionally, the keystrokes of the condensed keyboards may also generate an almost unlimited number of non-language characters. For example, the keyboards may be configured to generate ASCII characters.

Turning now to the figures, FIG. 1A shows a system diagram of a device employing a compact keyboard for entering data. More particularly, FIG. 1A shows a system 100 comprising an electronic device 110 coupled to a condensed keyboard 140. Keyboard 140 may generate signals based on a user manipulating keys of keyboard 140 and transmit the signals to electronic device 110.

Electronic device 110 may receive the signals generated by keyboard 140 and generate different display characters for a display 120. For example, electronic device 110 may comprise a processor 112 executing software instructions in memory 114. The software instructions may comprise an application, such that the software instructions interact with keyboard 140 interfacing hardware in electronic device 110 and generate different characters on display 120 based upon how the keys of keyboard 140 are manipulated. More specifically, the embodiment of FIG. 1A may have an actuation determiner 116 that responds to the different signals generated by keyboard 140. As an example, keyboard 140 may generate one signal when key 150 is manipulated one way, and generate a different signal when key 150 is manipulated a different way. Actuation determiner 116 may receive the different signals generated by keyboard 140 and convert the signals into respective individual control codes. Actuation determiner 116 may then transmit the individual control codes, which correspond to different key operations, to a character generator 118. Upon receiving the individual control codes, character generator 118 may generate characters such as letters and numbers. Processor 112 may work in conjunction with memory 114 and display the different characters generated by character generator 118 on display 120.

Electronic device 110 may perform certain actions based on the characters transmitted from keyboard 140. For example, electronic device 110 may open, or execute, a software application stored in read only memory (ROM) of electronic device 110. As noted above, a software application may already be running on electronic device 110, such as a word processor, and electronic device 110 may simply display the character generated by keyboard 140 on display 120.

The type of electronic device 110 may vary from embodiment to embodiment. For example, in one embodiment, electronic device 110 may comprise a personal digital assistant (PDA) or an electronic organizer. In other embodiments, electronic device 110 may comprise a cellular or mobile telephone. In further embodiments, electronic device 110 may comprise a laptop computer. In even further embodiments, electronic device 110 may comprise a portable music player, a portable word processor, or a portable device carried and used by a field technician. Also, depending on the nature of electronic device 110, display 120 may vary in different embodiments. For example, in some embodiments display 120 may comprise a color screen, such as a color thin-film transistor (TFT) liquid crystal display (LCD) screen. In other embodiments, display 120 may comprise a monochrome LCD screen. In further embodiments, display 120 may comprise a color plasma screen, cathode ray tube monitor, or even an analog or digital projector.

In addition to keyboard 140, system 100 may also be coupled to other devices that facilitate information being transmitted to and from electronic device 110. As depicted in FIG. 1A, electronic device 110 may be coupled with an input-output (I/O) device 130. In some embodiments, for example, I/O device 130 may comprise a trackball or an optical mouse. In other embodiments I/O device 130 may comprise an optical scanner, such as a scanner to read universal product codes. In other embodiments I/O device 130 may comprise a radio frequency identification (RFID) tag reader. In even further example embodiments, I/O device 130 may comprise a microphone, a speaker, a fingerprint reader or optical scanner, or an external storage device. Such I/O devices may work in conjunction with keyboard 140, sending and receiving information to and from electronic device 110. For example, keyboard 140 may generate characters to be displayed at a location on display 120, the location being selected by a mouse I/O device 130.

As depicted in FIG. 1A, keyboard 140 may comprise a number of keys. More specifically keyboard 140 may comprise a set of keys that may be operated by a left hand of the user, such as keys 150, 152, 154, and 156. Keyboard 140 may also comprise a set of keys that may be operated by a right hand of the user, namely keys 160, 162, 164, and 166. Also as depicted in FIG. 1A, left-hand keys 150, 152, 154, and 156 as well as right-hand keys 160, 162, 164, and 166 may be arranged in a pair of vertical rows. Arranging the sets of keys in this manner may allow the keys to be affixed to a backside of electronic device 110, such that the user may hold electronic device 110 and simultaneously manipulate the keys to generate characters for display 120. For example, one can imagine electronic device 110 comprising a PDA with a color screen display 120 facing the user, having keyboard 140 mounted on the underside of electronic device 110. The user may hold the PDA by placing hands on the left and right sides of electronic device 110, with the left index finger wrapped around the side of the device and being used to manipulate key 150. The middle, ring, and pinky fingers of the left hand may likewise be used to manipulate keys 152, 154, and 156, respectively. Similarly, the index, middle, ring, and pinky fingers of the right hand may manipulate the right-hand keys 160, 162, 164, and 166, respectively.

In an alternative embodiment, electronic device 110 may comprise a palmtop personal computer. The palmtop computer may have display 120 facing the user, while keyboard 140 is attached to display 120 housing via a horizontal hinge assembly located at the bottom of display 120, with keyboard 140 positioned perpendicular to display 120. In this configuration, both display 120 and keyboard 140 may be on sides of electronic device 110 facing the user. In this configuration, which may be similar to the manner in which many laptop computer keyboards are oriented, keys of keyboard 140 may reside in a single row. In other words, keys 150, 152, 154, 156, 160, 162, 164, and 166 may be positioned from left to right, running parallel with the bottom edge of display 120. Keyboard 140 may have these eight keys, as well as other keys, yet comprise a condensed and more compact keyboard than conventional keyboards having thirty-five or more keys.

As described in the preceding paragraphs, various embodiments of keyboard 140 may comprise horizontally or vertically mounted keys located on either the front or back of electronic device 110. Aside from these variations, system 100 may be arranged in numerous other configurations. For example, electronic device 110 may comprise a system board of a supercomputer located in one room of a building, while keyboard 140 may be located in an adjacent room and coupled to the system board via a universal serial bus (USB) cable. In this embodiment, display 120 may comprise a remote display terminal located in front of keyboard 140. In another embodiment, keyboard 140 may be coupled to electronic device 110 via a wireless link using, for example, Bluetooth® technology. Another embodiment variation may have I/O device 130 located integrally with keyboard 140. For example, I/O device 130 may comprise a joystick mouse device or capacitance touchpad located between the rows of the left-hand keys (150, 152, 154, and 156) and right-hand keys (160, 162, 164, and 166).

In other various embodiments, the components of system 100 may be arranged differently and include differing numbers of components. For example, one embodiment of system 100 may have actuation determiner 116 physically located in a housing of keyboard 140. In another embodiment, actuation determiner 116 and character generator 118 may comprise a single component. In another embodiment, character generator 118 may comprise software instructions in memory 114, such that processor 112 executes the software instructions in conjunction with the control codes generated by actuation determiner 116 to display different characters on display 120. In even further embodiments, electronic device 110 may have a module situated between character generator 118 and memory 114, such that the module translates the characters generated by character generator 118 into different characters. For example, the module may translate lower case characters generated by character generator 118 into upper case characters that are transmitted to memory 114 and processor 112.

Figure 1B:
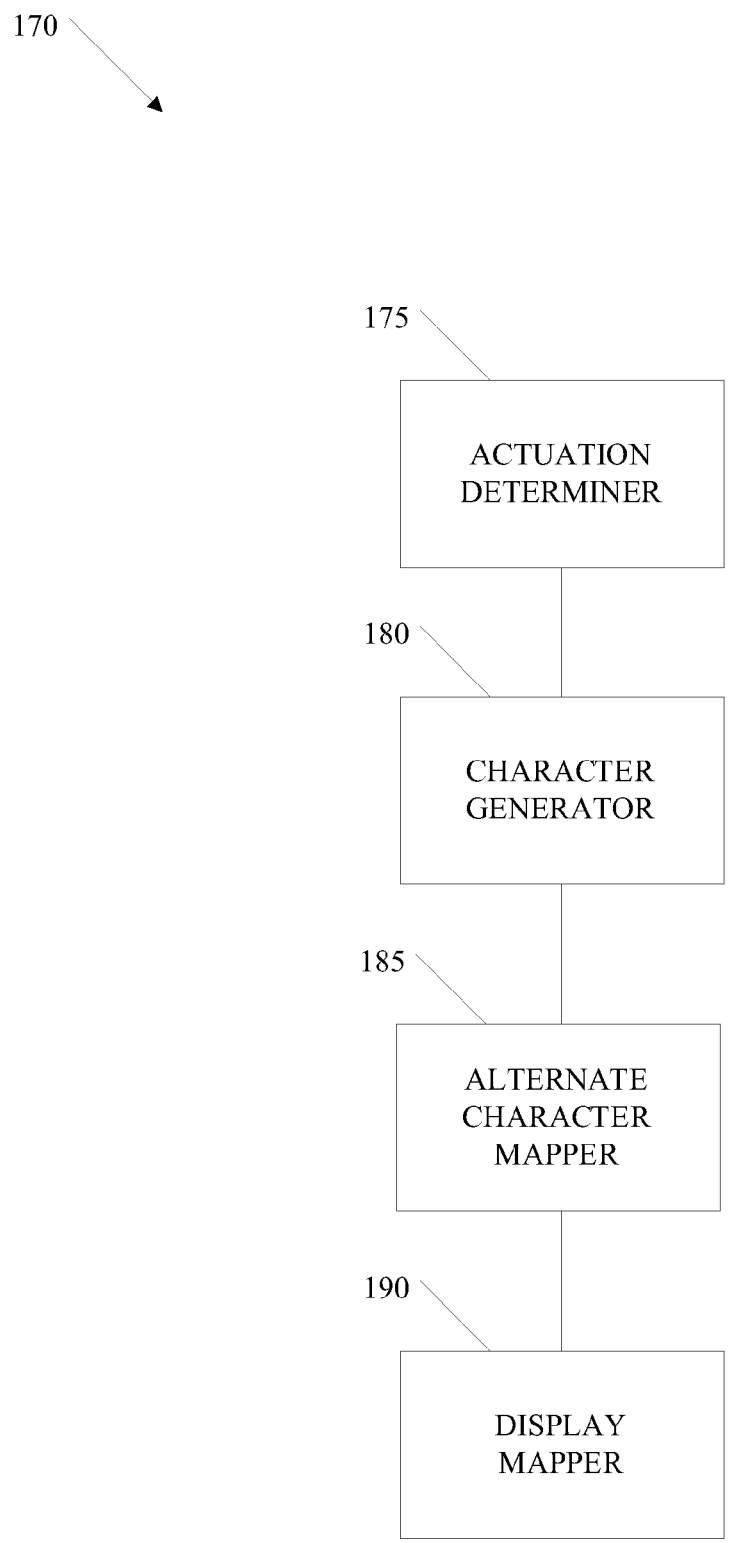
FIG. 1B shows a compact keyboard engine.

To exemplify how a key of a compact or condensed keyboard, such as keyboard 140, may generate several characters for an electronic device, such as electronic device 110, we turn to FIG. 1B. FIG. 1B depicts an embodiment of an apparatus, a condensed keyboard engine 170. One component of condensed keyboard engine 170 may be an actuation determiner 175. Actuation determiner 175 may comprise hardware necessary to sense or detect activation of one or more keys, such as keys 154 and 160 of keyboard 140 in FIG. 1A. For example, in one embodiment, actuation determiner 175 may comprise metal and/or plastic structural members that support a key head, wherein the structural members are coupled to sensing elements, such as contacts or switches. In addition, actuation determiner 175 may include electronics to modify, amplify, or encode signals in response to sensing key activation.

Actuation determiner 175 may generate different signals in response to different ways a user may activate a key. That is to say, actuation determiner 175 may generate one signal when a key is simply depressed, generate a second and different signal when the key is first pushed in a first direction and then depressed, and generate a different third signal when the user pulls the key in a second direction before depressing it. For example, in one embodiment, actuation determiner 175 may generate 0.20 volts when the key is depressed, 0.1 volts when the key is pulled before depression, and 0.3 volts when the key is pushed before depression. Activation determiner 175 may generate such different voltage signals when the key sensing technology employs, for example, strain gauges or variable capacitance. In other embodiments, activation determiner 175 may generate discrete signals in response to contact closings and openings, wherein the contacts are coupled to the key body.

In even further embodiments, actuation determiner 175 may generate other types of signals, such as alternating current and alternating frequency signals when users activate keys. For example, actuation determiner 175 may generate one frequency when a key is pushed and depressed and generate another frequency when the key is pulled and depressed. The number of different sensing technologies that actuation determiner 175 may employ is virtually unbounded and will vary in different embodiments depending on the needs of the application. For more examples and discussion, one may review FIG. 3A, FIG. 3B, and the discussions for each.

The number of different actuation determiners 175 may vary in different embodiments. For example, one embodiment may have one actuation determiner 175 for each key. In the embodiment depicted in FIG. 1A, therefore, system 100 may employ eight actuation determiners 175. Another embodiment may have only one actuation determiner 175 monitoring all keys. Again, as an example, system 100 in FIG. 1A may have a single actuation determiner 175 monitoring keys 150, 152, 154, 156, 160, 162, 164, and 166.

The signals and codes generated by actuation determiner 175 may be transmitted, or transferred, to a character generator 180. Character generator 180 may receive the different signals and codes and generate corresponding characters. For example, in one embodiment character generator 180 may receive a 0.20 volt signal from actuation determiner 175 when a key is depressed, 0.1 volts when the key is pulled before it is depressed, and 0.3 volts when the key is pushed before depression. In response to receiving the 0.2, 0.1, and 0.3 volt signals, character generator 180 may generate combinations of logical bits, such as logical ones and zeroes arranged in data strings, such as nibbles, words, and double words. For example, character generator 180 may generate 10011001 when upon receiving a 0.2 volt signal from actuation determiner 175 and 01001011 upon receiving a 0.3 volt signal. Alternatively, character generator 180 may generate ones and zeroes corresponding to different ASCII characters.

Character generator 180 may transmit the encoded characters to an alternate character mapper 185. Alternate character mapper 185 may receive the encoded characters from character generator 180 and convert them into alternate encoded characters. For example, when character generator 180 transmits a set of ASCII encoded bits corresponding to the letter "A" when a key is depressed, alternate character mapper 185 may instead transmit a different set of encoded bits corresponding to a letter of another language, such as an Arabic letter or character "ش". However, alternate character mapper 185 may be enabled or disabled. If disabled, for example, alternate character mapper 185 may simply pass, unaltered, the encoded bits transmitted from character generator 180 to display mapper 190. Even further, some embodiments may not include alternate character mapper 185.

Display mapper 190 may receive the encoded bits representing different characters and facilitate the characters being displayed on a screen for the user. For example, display mapper 190 may comprise a combination of software, memory, and a processor, such that when processor executes the software, successive characters received by display mapper 190 are stored in successive memory locations. A display adapter may then examine the data bits in the memory locations and display the different characters on specific areas on the screen. Additionally, in some embodiments, display mapper 190 may perform the functions typically associated with a display adapter, such as a video card.

Actuation determiner 175, character generator 180, alternate character mapper 185, and display mapper 190 may comprise hardware, such as processors and memory devices, or they may comprise software, such as coded instructions of software residing in volatile and nonvolatile memory. For example, in one embodiment, actuation determiner 175 may comprise mostly hardware components, such as a key head, springs, and contacts or strain gauges, while character generator 180, alternate character mapper 185, and display mapper 190 comprise instructions stored in volatile memory, executed by a processor. In another embodiment, however, actuation determiner 175, character generator 180, alternate character mapper 185, and display mapper 190 may all exist as hardware devices, such as hardware comprising a state machine. Additionally, the components of condensed keyboard engine 170 may comprise single or numerous hardware components. For example, one embodiment may implement character generator 180, alternate character mapper 185, and display mapper 190 in a system employing a single processor. Another embodiment may employ numerous processors to implement such functions.

Figure 2A:
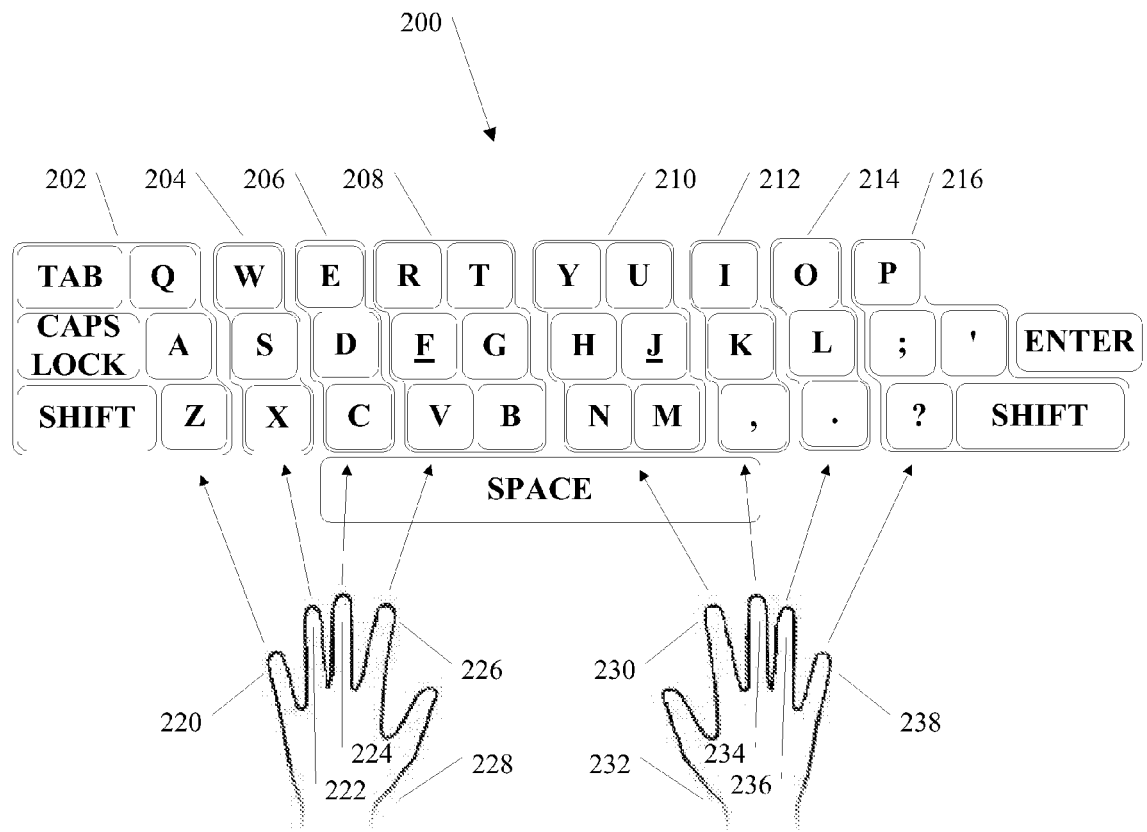
FIGS. 2A-2B illustrate how keys from a conventional full-size keyboard may be mapped onto a compact keyboard having fewer keys.
Figure 2B:
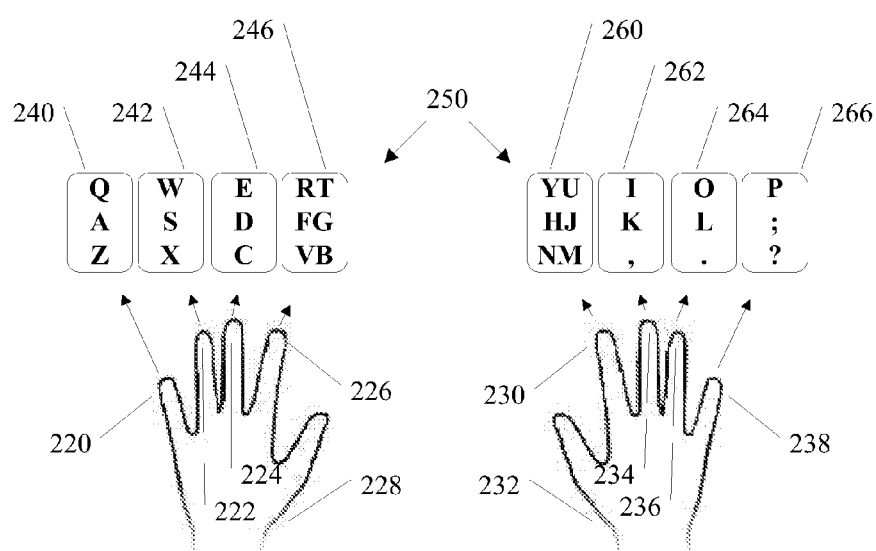

To illustrate how keys from a conventional full-size keyboard may be mapped onto a compact keyboard having fewer keys, we turn to FIGS. 2A and 2B. FIG. 2A depicts a full-size conventional QWERTY keyboard 200 having thirty-seven keys. As shown in FIG. 2A, fingers on a left hand 228 and fingers on a right hand 232 of a user may strike individual keys of keyboard 200. More specifically, a pinky finger 220 may be used to depress any one of key cluster 202. For example, left hand 228 pinky finger 220 may be used to strike "Q", "A", "Z", "Left-SHIFT", "CAPS LOCK", or "TAB" keys of cluster 202. Likewise, left hand 228 ring finger 222 may strike keys of cluster 204, middle finger 224 may strike keys of cluster 206, and index finger 226 may strike keys of cluster 208. Similarly, right hand 232 fingers 230, 234, 236, and 238 may strike keys of clusters 210, 212, 214, and 216, respectively.

In FIG. 2B, one can see how keys of the clusters in FIG. 2A may be mapped to single keys of a condensed keyboard 250. Fingers of left hand 228 may operate keys 240, 242, 244, and 246, while right hand 232 fingers may operate keys 260, 262, 264, and 266. As an example, the "R", "F", "V", "T", "G", and "B" keys of cluster 208 in FIG. 2A may be mapped onto key 246 of keyboard 250 in FIG. 2B. In other words, the user may generate any one of the characters (R, F, V, T, G, or B), which would otherwise be associated with the keys of cluster 208 for a full-size keyboard, depending on how the user manipulates key 246. If the user uses index finger 226 to push key 246 directly up (forward) and then depresses key 246, keyboard 250 may generate the character "R". Similarly, the user may use left hand 228 index finger 226 to pull key 246 down and to the right, and then depress key 246 to generate the character "B".

Similar to the manner in which the characters for cluster 208 of FIG. 2A may be mapped to key 246 of FIG. 2B, the characters for clusters 202, 204, 206, 210, 212, 214, and 216 of keyboard 200 may be mapped to keys 240, 242, 244, 260, 262, 264, and 266 of keyboard 250. More specifically, as shown in FIG. 2B, the following characters may be mapped to corresponding keys:

| Full-size keyboard 200 characters | | Corresponding single keys of keyboard 250 |
|---|---|---|
| Left hand keys | | |
| Pinky characters | Q, A, Z | Key 240 |
| Ring finger characters | W, S, X | Key 242 |
| Middle finger characters | E, D, C | Key 244 |
| Index finger characters | R, F, V, T, G, B | Key 246 |
| Right hand keys | | |
| Index finger characters | Y, H, N, U, J, M | Key 260 |
| Middle finger characters | I, K, "," | Key 262 |
| Ring finger characters | O, L, "." | Key 264 |
| Pinky characters | P, ";", "?" | Key 266 |

It should be noted that while the full-size keyboard in FIG. 2A is a QWERTY keyboard, the characters of other keyboards may also be mapped to compact keyboards similar to keyboard 250 in FIG. 2B. In other words, alternative embodiments may comprise device firmware that will allow alternative key layouts and associated character mapping. For example, instead of key 246 of keyboard 250 generating the characters produced by a left index finger of a user typing on a QWERTY keyboard, key 246 may also be configured to generate the characters produced by the same finger if the user instead used a DVORAK keyboard. Also, while key 240 of keyboard 250 for the embodiment depicted in FIG. 2B may generate only the characters of "Q", "A", and "Z", other embodiments may map other characters. For example, key 240 may also be configured to generate the "TAB", "CAPS LOCK", and "Left-SHIFT" characters and control sequences. Such keys may be used in conjunction with other keys to produce, for example, upper and lower case letters. Additionally, since many embodiments may require little actual travel of the fingers, users unfamiliar with any standard mapping may easily define a reasonably efficient and usable mapping which they can learn. For example, a person may just assign A-D to a first key, E-H to a second key, and so on until all characters are mapped.

It should also be noted that while the condensed keyboard 250 shown in FIG. 2B has eight keys, alternative embodiments may have different numbers of keys. For example, instead of eight keys, keyboard 250 may have six, ten, eleven, or twelve keys. In the case of more keys, the additional keys may be placed adjacent to keys 240, 246, 260, and 266 to provide an alternative keyboard layout and generate different character combinations. That is to say, for example, key 260 may have another key located to the left of it, to generate the characters "Y", "H", and "N", while key 260 may generate the characters of "U", "J", and "M". In such an embodiment, the user may lift right hand 232 index finger 230 off of key 260 and instead strike the adjacent key when needing to generate the "Y", "H", or "N" characters. Upon examination of these embodiment variations, one may see that innumerable character mappings with different numbers and combinations of keys are possible.

Also worthy of note, for the sake of simplicity, FIGS. 2A and 2B illustrate key mappings for capital letters only. However, different embodiments may easily generate lowercase letters as well as capital, or uppercase letters. Additionally, further embodiments may generate only uppercase letters. Even further embodiments may generate only lowercase letters.

Figure 3A:
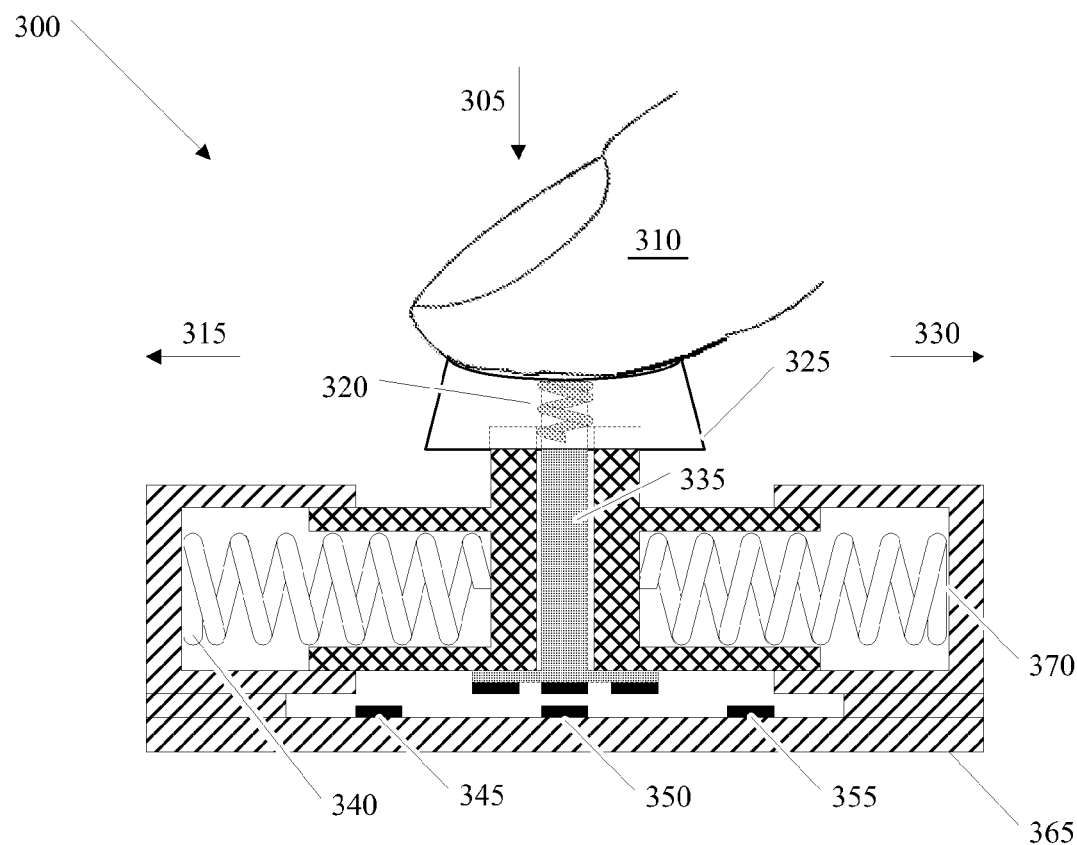
FIGS. 3A-3B show two single keys that may be used to enter multiple characters.
Figure 3B:
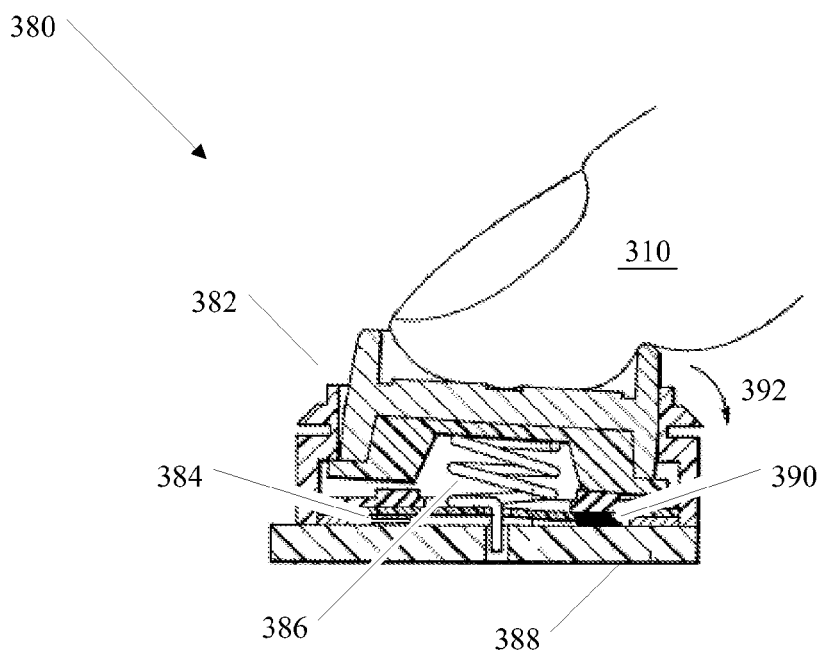

Turning now to FIG. 3A and FIG. 3B, we see two key apparatuses which may be used to generate multiple characters in various embodiments. For example, key 240, key 246, key 262, or any of the other keys of FIG. 2B may comprise either of the apparatuses in FIGS. 3A and 3B.

The inner workings of a sliding key assembly 300 are illustrated in FIG. 3A. Sliding key assembly 300 may comprise a key housing 365 containing a forward spring 340 and a reverse spring 370. Forward spring 340 and reverse spring 370 may serve to center key head 325 over contact point 350, such that key head 325 may be in a home, or neutral, position when not being manipulated by a person. To generate a character for an electronic device, the person may use a finger 310 to position key head 325 over one of the contact points (345, 350, and 355) and press key head 325 in the downward direction 305. Pressing key head 325 down may cause key plunger return spring 320 to compress and cause key shaft 335 to slide down and mate with one of the contact points 345, 350, or 355. Touching contact points 345, 350, and 355 in this manner may effectively close an electrical circuit, which a keyboard or system employing key assembly 300 may use to generate a character.

To illustrate manipulating key assembly 300 to generate a couple of characters, the person may use finger 310 to push key head 325 in the forward direction 315. When moved in this direction, forward spring 340 may compress and reverse spring 370 may uncoil or expand. When key head 325 is in the full forward position, the user may then press key head 325 in the downward direction 305, causing key plunger return spring 320 to compress, causing key shaft 335 to slide down and make with contact point 345, resulting in one character being generated by the keyboard. The person may release key head 325, whereupon plunger return spring 320 may uncoil and retract key shaft 335 up and away from contact point 345. Forward spring 340 may expand while reverse spring 370 contracts, returning key head 325 to the home position centered over contact 350.

Alternatively the person may use finger 310 to pull key head 325 in the reverse direction 330. When moved in this direction 330, forward spring 340 may expand while reverse spring 370 compresses. When in the full reverse position, the user may then press key head 325 in the downward direction 305, causing key plunger return spring 320 to compress and key shaft 335 to slide down and make with contact point 355, resulting in a second character being generated by the keyboard. Again, when released, plunger return spring 320, forward spring 340, and reverse spring 370 may reposition key head 325 to the home position, ready to accept another keystroke.

An alternative key assembly 380 is depicted in FIG. 3B. Instead of having a sliding key assembly similar to the one shown in FIG. 3A, FIG. 3B illustrates one method or technique whereby key assembly 380 may remain almost stationary yet produce multiple characters for an electronic device.

A key 382 may rest atop a support spring 386, such that key 382 essentially floats above a pair of contacts 384 and 390. For example, key 382 may be held in a home position by spring 386, in which case both contact 384 and contact 390 may be open. To generate a character, a user may pull finger 310 and cause key 382 to pivot about the top of support spring 386 (see directional arrow 392) and close contact 390. Electronics of a keyboard containing key assembly 380 may sense the closing of contact 390 and generate a first character. Once released by the user, support spring 386 may rotate key 382 back to the upright floating position, where contact 390 and contact 386 are both open again. That is to say, similar to the home position of key head 325 in FIG. 3A, key 382 may return to the home position when released by finger 310.

A second character may be generated when key 382 is pushed instead of pulled. Pushing key 382 forward in this manner may again cause key 382 to rotate about the top of support spring 386, but this time forward. When rotated forward, contact 384 may close while contact 390 remains open. Electronics of the keyboard may sense the closing of contact 384 and generate the second character.

A third character may be generated when key 382 is not pushed forward nor pulled back but instead pressed straight down. For example, when finger 310 presses key 382 straight down, contact 384 and contact 390 may both close. Software and/or hardware may sense that both contact 384 and contact 390 closed essentially simultaneously. Accordingly, the keyboard software and/or hardware may respond by generating a third character.

While the key embodiments depicted in FIGS. 3A and 3B demonstrate how single key assemblies may generate three characters, alternative embodiments may utilize the same techniques in different combinations to generate additional characters. For example, key assembly 380 in FIG. 3B may have more contacts in addition to contacts 384 and 390. The additional contacts may be located in alternate locations such that they close when key 382 is properly manipulated. Similarly, sliding key assembly 300 may employ additional contacts at different locations to generate additional characters. For example, sliding key assembly 300 may have three additional contacts located in parallel and adjacent to contacts 345, 350, and 355. Similar to the manner in which the person moved key head 325 over contacts 345, 350, and 355, the person may move key head 325 over each of the additional individual contacts to generate three more characters. The configuration of six contacts may be necessary to generate six characters. For example, such a key configuration may be necessary to implement keys 240, 246, 260, and 266 for keyboard 250 in FIG. 2B.

The embodiment keys of FIGS. 3A and 3B employ springs and electrical contacts to facilitate movement and sense desired character generation for a condensed keyboard. However, sliding key assembly 300 and key assembly 380 are only two examples of possible key designs. Alternative embodiments may employ alternative technologies to sense key position and desired character generation. For example, an alternative key assembly may comprise a key resting atop a rigid but semi-flexible structural key support, such that devices attached to the structural key support sense when the key is pushed, pulled, and depressed. Devices to sense the pushing, pulling and depression of the key may be strain gauge members, resistive, capacitive, or inductive elements that change electrical properties based on pressure and/or tension. These variations, as well as variations similar to them, may all comprise different embodiments of key assemblies for different keyboards.

Figure 4A:
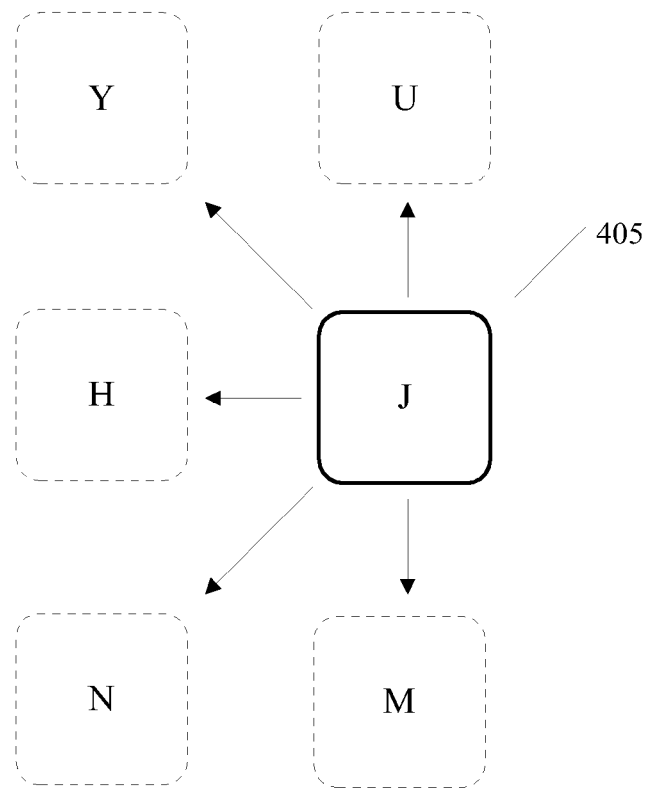
FIGS. 4A-4C illustrate directional key movements for entering multiple characters from a single key.
Figure 4B:
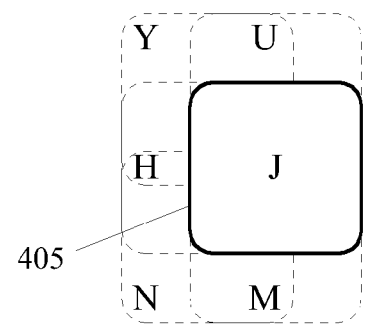
Figure 4C:
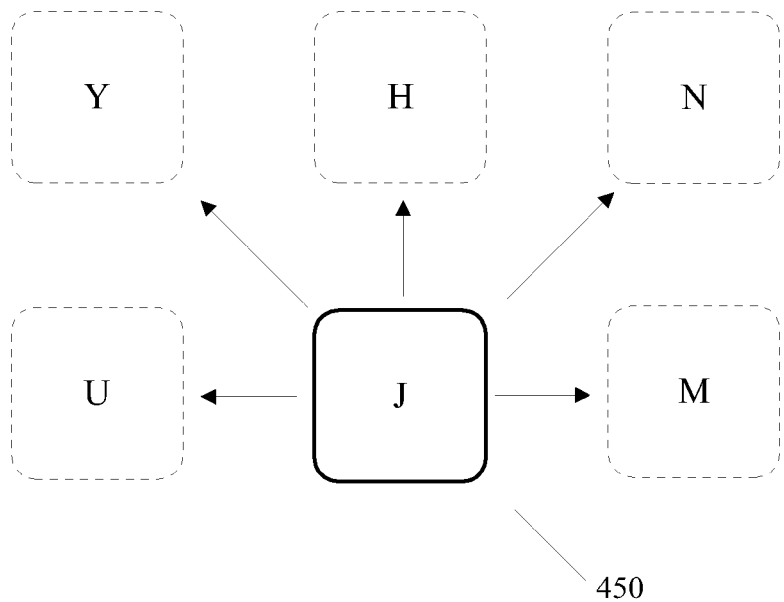

FIGS. 2A and 2B illustrated how multiple keys from a QWERTY keyboard may be mapped onto a condensed keyboard having fewer keys, wherein single keys may produce multiple characters. FIGS. 3A and 3B illustrated the inner workings of two keys and how those single keys may be configured to produce multiple characters based on positioning the keys before depressing them. FIGS. 4A, 4B, and 4C illustrate how a key may produce one set of characters with different mapping orientations. In other words, a key may generate one character when depressed in a certain position in one configuration but generate a different character when depressed in the same position when mapped in a different configuration. This concept of mapping, which may be considered to be the way a key can be configured to produce different characters, should become clear after reading the following few paragraphs.

FIG. 4A illustrates a possible mapping configuration for a key in a condensed keyboard having a horizontal key orientation, such as the horizontal keyboard 250 shown in FIG. 2B. For example, key 405 in FIG. 4A may represent key 260 in FIG. 2B. Key 405 may produce a "J" character when depressed without first moving it up, down, left, or right. To produce a "U" character, FIG. 4A shows that a user must first move key 405 up and then depress it. Similarly the user would have to move key 405 left and then depress it to produce an "H" character. To produce a "Y" character, however, the user would have to move key 405 both up and to the left before depressing it. Similar manipulations would be required to produce characters of "N" and "M".

FIG. 4B illustrates, in a concise manner, the directional movements illustrated in FIG. 4A. As shown in FIG. 4B, the bold key 405 may produce the "J" character simply by pressing it without any other directional movement. Similar to FIG. 4A, the user must move the key up to produce the "U" character, left to produce the "H" character, down to produce the "M" character, both up and left to produce the "Y" character, and both left and down to produce the "N" character. These alternative character positions are shown with dashed lines. One may note that the sequence of movements for key 405 may differ in various embodiments. For example, in one embodiment a user may have to first move key 405 and then depress it in order to produce a character. In other embodiments, however, a user may possibly depress key 405 first and then move the key in a direction before releasing it to generate a character.

In the manner FIG. 4A may illustrate the mapping configuration for a key in a horizontal keyboard arrangement, FIG. 4C may illustrate the mapping configuration for a key 450 in a vertical keyboard arrangement. For an example vertical key arrangement, one may turn to keyboard 140 in FIG. 1. Note that left-hand keys 150, 152, 154, 156 and right-hand keys 160, 162, 164, 166 are arranged in a vertical manner, instead of horizontally like keyboard 250 in FIG. 2B. In order to simulate the natural movements that a QWERTY keyboard typist may be inclined to make for a vertical keyboard arrangement the character mapping may have to be altered.

A contrasting distinction should be made between FIG. 4A and FIG. 4C in order to make lucid this need to alter the character mapping configurations between vertical and horizontal keyboard arrangements. FIG. 4A, represents the directional movements a typist may need to make when the condensed keyboard is arranged horizontally, which matches the orientation of keys on a conventional QWERTY keyboard. For example, the user is inclined to move his finger forward or up to produce the "U" character and left to produce the "H", just as one would do when typing on a QWERTY keyboard. However, when the keys are separated and rotated to form vertical key rows, the directional movements may change. Instead of moving the finger up or forward to produce the "U" character, the user may need to instead move the finger to the left. For the same reason, the user may need to move his finger up instead of left to produce the "H" character when the key row orientation changes from horizontal to vertical. When one contrasts the directional differences of the character locations in FIGS. 4A and 4C, this different character mapping may be seen.

As FIG. 4C illustrates, the user may need to move his finger to the right to produce the "M" character, up and left to produce the "Y" character, and up and to the right to produce the "N" character. This same character mapping is illustrated in the more concise depiction of key 555 in FIG. 5. In this embodiment having vertical key row arrangements, keys 505, 510, 515, and 520 illustrate possible character mappings for a left hand of a user, while keys 555, 560, 565, and 570 illustrate possible character mappings for a right hand of a user.

Figure 5:
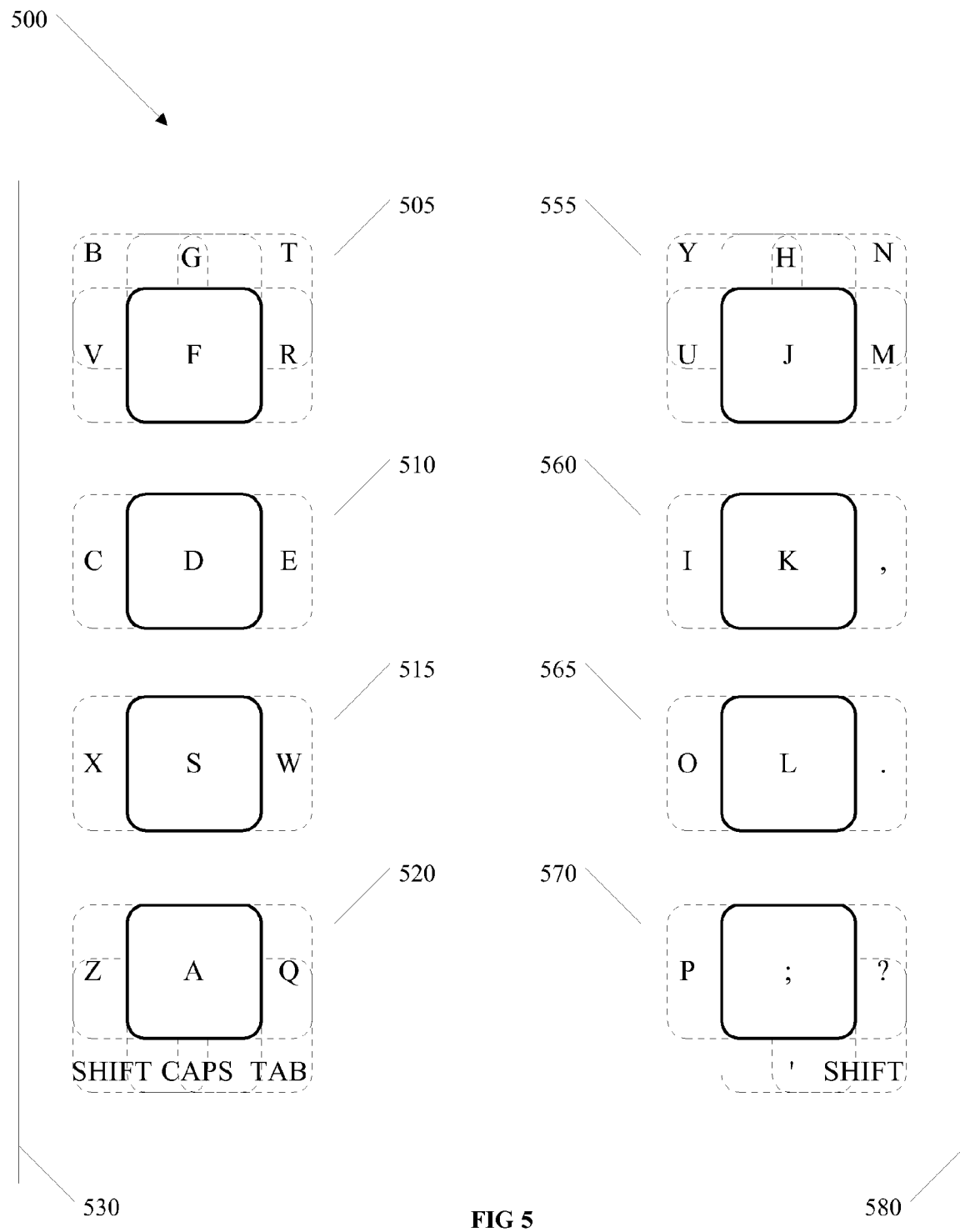
FIG. 5 illustrates directional key movements for eight keys that may be arranged on the back side of a portable electronic device.

To understand the character mappings for the keys depicted in FIG. 5, one may need to visualize using keyboard 500. For the sake of explanation, assume that all of the keys of keyboard 500 are located on the backside of a portable electronic device. Further, assume that FIG. 5 shows the orientation of the keys when a user would hold the device with both the left and right hands, facing the screen. The keys may be oriented as shown in FIG. 5, but located on the back of the portable device such that the user may grasp the sides of the device, left hand on left-hand side 530 and right hand on right-hand side 580, and place the left-hand index finger on key 505, the left-hand middle finger on key 510, left ring finger on key 515, and pinky on key 520. Similarly, the user may place the right-hand index finger on key 555, the right-hand middle finger on key 560, and so on.

With the user holding the portable electronic device with keyboard 500 on the back, the user may generate, for example, an "E" character by moving key 510 to the right using the left-hand middle finger before depressing key 510. Effectively, moving key 510 in this manner may require the user to "push" the key toward the center of the device. Similarly, the user may generate an "M" character by moving key 555 to the right using the right-hand index finger. Effectively, moving key 555 in this direction may require the user to "pull" the key toward the right edge of the device. Similar movements may be required to generate the other characters using keyboard 500. Also, in some embodiments, the user may generate multiple characters rapidly by holding a key down after positioning it. For example, after moving key 555 to the right and pressing it, the user may continue to hold the key in the pressed position for the keyboard to generate multiple "M" characters for the portable electronic device.

FIGS. 6A, 6B, and 6C depict two embodiments of possible condensed keyboard arrangements for a PDA 600. As shown in FIG. 6A, PDA 600 may have a display screen 610, a left thumb key 605, a right thumb key 615, and other control keys 620. A user may grasp the left and right sides of PDA 600, placing the left thumb on key 605 and the right thumb on key 615. Additionally, the user may place other left and right-hand fingers on keys located on the backside of PDA 600. For example, FIG. 6B shows two vertical rows of keys on the backside of PDA 600. FIG. 6B shows the key arrangement that may bee seen when viewing the rear of PDA 600. When PDA 600 is rotated so that screen 610 is facing the user, the user may place her right index finger on key 632, right middle finger on key 634, right ring finger on key 636, and right pinky on key 638. Similarly, the user may place her left index, middle, ring, and pinky fingers on keys 642, 644, 646, and 648, respectively.

While holding PDA 600 with thumbs on keys 605 and 615, and other fingers on the keys of FIG. 6B as just described, the user may manipulate the keys to generate characters for PDA 600. That is to say, the arrangement of keys in FIG. 6B may help direct the movements of the user when manipulating the keys to generate the characters. An example would be using the keys to type an email message, which may be displayed on screen 610 of PDA 600. The user may manipulate the keys in FIG. 6B using character mapping and key directions similar to those described for FIG. 5 to generate the desired alphabetic characters. Thumb keys 605 and 615 may be used in combination with the other keys and generate "SPACE" characters, "CONTROL" signals, "ALTERNATE" signals, and "RETURN" or "ENTER" signals for PDA 600.

Alternative embodiments may assist the user by displaying keyboard cues on screen 610. For example, when the user is merely holding PDA 600, the home row characters for each of the keyboard keys may be depicted on the sides of screen 610, near keys 605 and 615. More specifically, screen 610 may display small boxes placed vertically along the left side near key 605 containing the characters "F", "D", "S", and "A", while small boxes on the right hand side near key 616 contain the characters "J", "K", "L", and ":". If the user moves key 642, for example, toward the center of PDA 600 using the left index finger, PDA 600 may respond by changing the "F" character on screen 610 to an "R". Changing the characters displayed on screen 610 in this manner may provide help, or visual cues, to aid the user in selecting the character to be generated for PDA 600.

The keys of FIG. 6B may be arranged in a relatively compact manner. For example, each of keys 632, 634, 636, 638, 642, 644, 646, and 648 may be substantially in the shape of a square, having a side measurement of 0.75 inches. Also, each vertical row of keys may have a measurement of approximately 3 inches, allowing for an overall compact and relatively small form factored keyboard.

FIG. 6C shows an alternative key set arrangement, whereby the keys on the back of a similar PDA 650 may be more ergonomically arranged than the keys of FIG. 6B. For example, keys 654 and 656 may be moved closer to the center of PDA 650, which may provide more comfortable home positions for the right-hand middle and ring fingers of the user. Similarly keys 652 and 658 may be located closer to the side of PDA 650, allowing for a more natural placement of the right-hand index and pinky fingers, respectively. Keys 662, 664, 667, and 668 may be arranged in a mirror-like fashion for the index, middle, ring, and pinky fingers, respectively, of the left hand of the user.

Figure 6D:
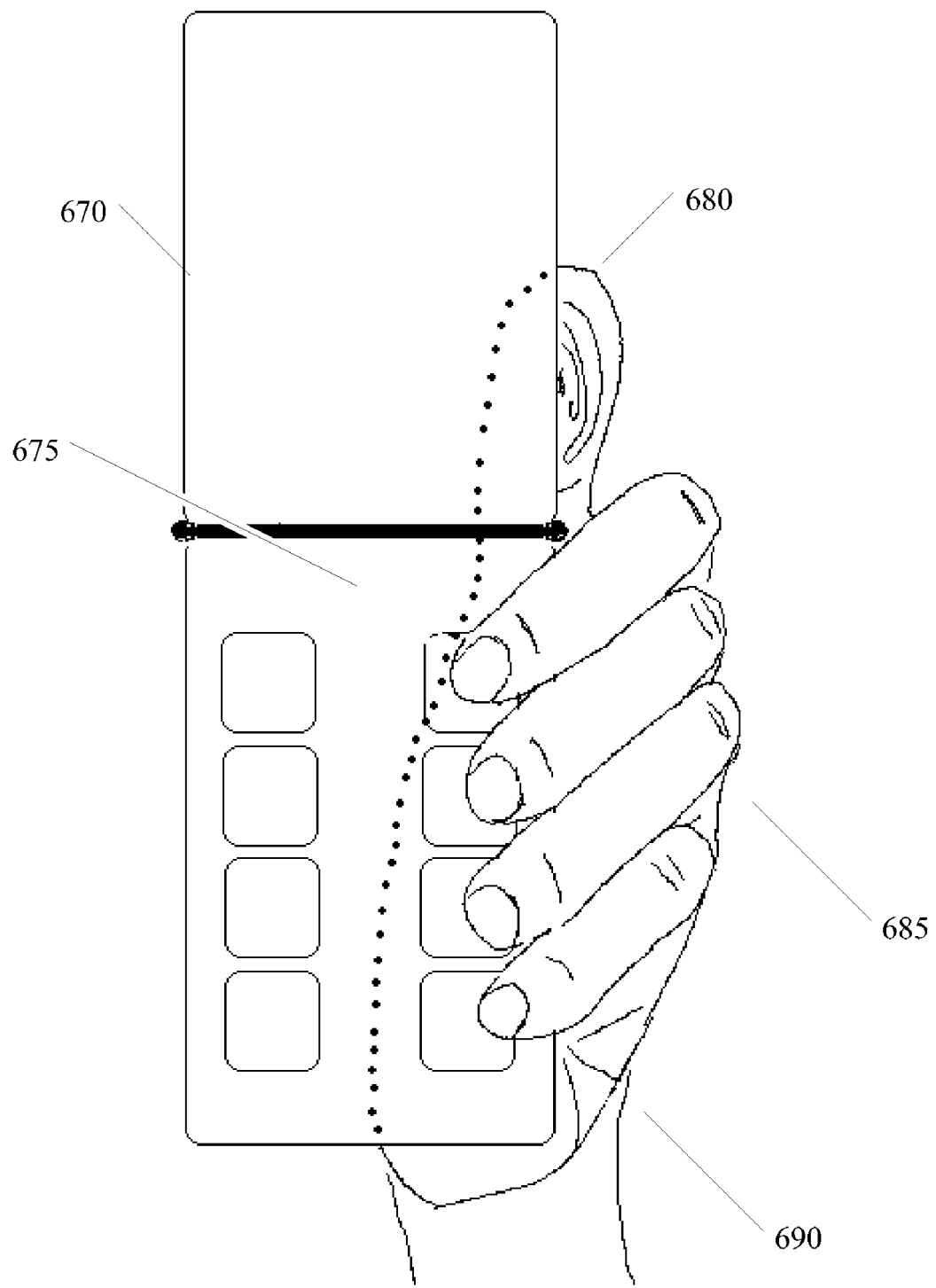
FIG. 6D illustrates how a person may grasp one side of a cellular telephone with a condensed keyboard on the back of the telephone.

While FIG. 6B shows a possible key arrangement for keys on the back of a PDA, FIG. 6D illustrates a similar condensed keyboard 675 arrangement for a cellular telephone 670 and how a person may grasp the condensed keyboard 675. More specifically, FIG. 6D illustrates how a left hand 690 of a user may be positioned while grasping the left-hand keys of the condensed keyboard 675. Note that while a left-hand thumb 680 may be applied to a face of a screen for cellular telephone 670, the remaining fingers 685 may be curled around and placed on the individual keys of condensed keyboard 675. Grasping cellular telephone 670 in this manner, using both left hand 690 and a right hand similarly situated, may allow a user to firmly hold cellular telephone 670, yet still manipulate keys for condensed keyboard 675 and enter text and other characters into cellular telephone 670.

While the devices of FIGS. 6A, 6B, and 6C may comprise PDAs 600 and 650, and FIG. 6D may comprise a cellular telephone 670, in other embodiments the devices may be electronic organizers or other portable electronic devices. Additionally, other arrangements of keys may be possible in various embodiments for different devices. For example, while thumb keys 605 and 615 may be two-position keys in some embodiments, they may be single-position keys in alternative embodiments. Similarly, keys 605 and 615 may comprise three or four-position keys in other embodiments.

Figure 7A:
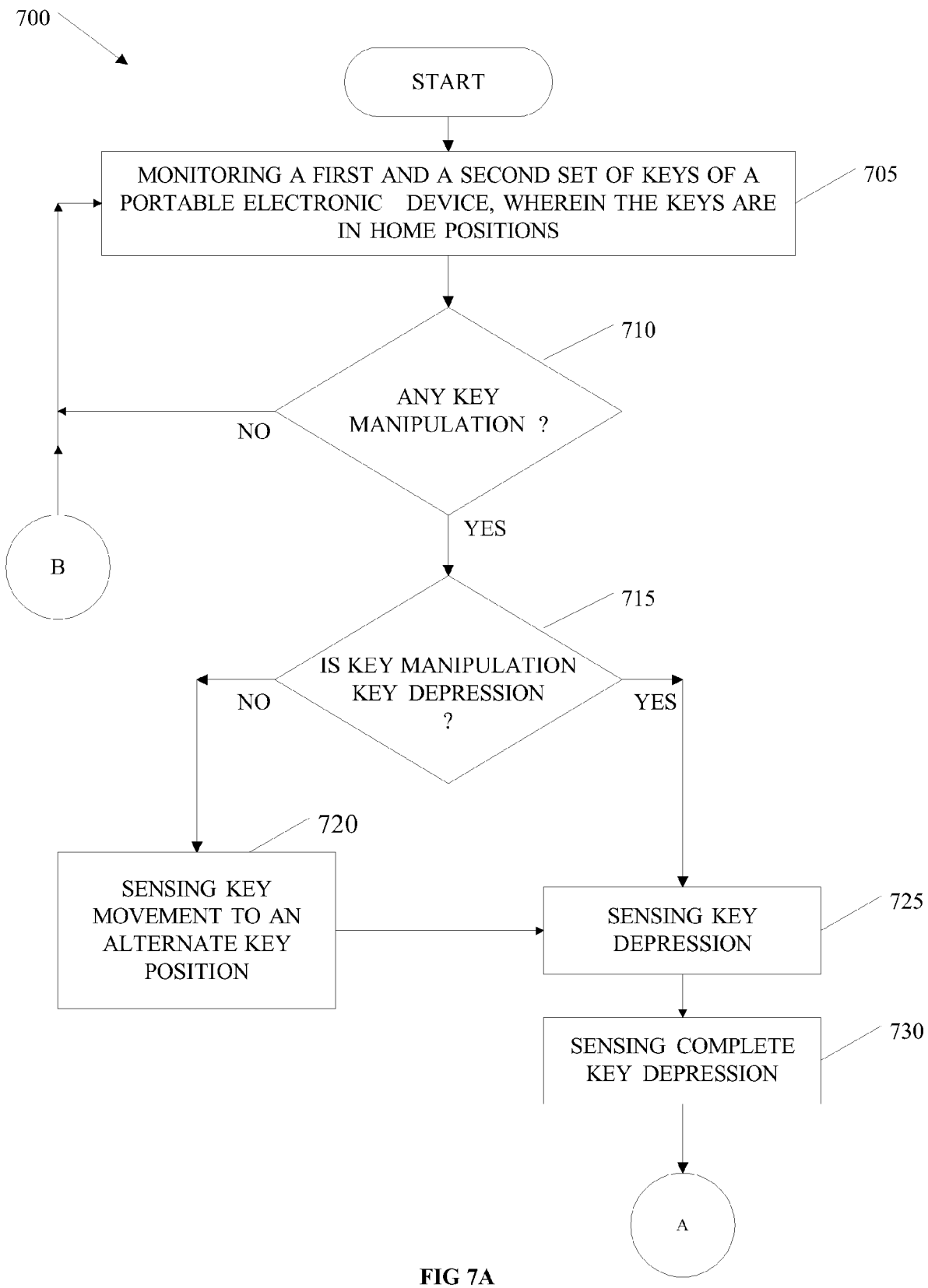
FIGS. 7A-7B depict a flowchart of a method for sensing key manipulation and character generation for an electronic device.
Figure 7B:
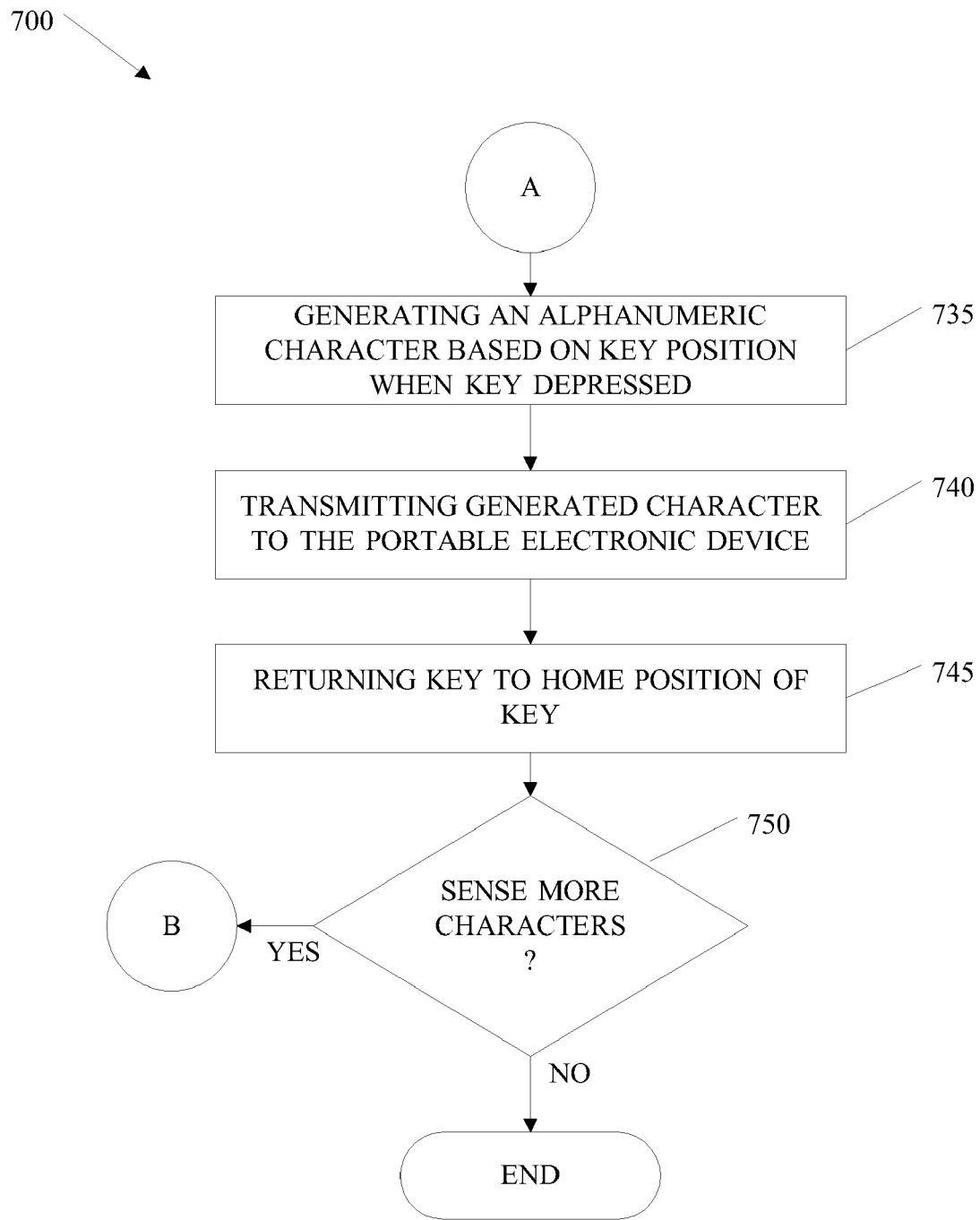

FIGS. 7A and 7B depict a flowchart 700 illustrating an example embodiment of a method for a condensed keyboard generating multiple characters from individual keys. The keyboard of flowchart 700 may reside on the back of a portable electronic device, like the keyboard shown on the back of PDA 650 in FIG. 6C, and generate alphanumeric characters for the device. Such characters may be used to control and/or operate the device, or to just enter data into an application running on the device.

As shown in FIG. 7A, flowchart 700 may begin with monitoring a first and a second set of keys for the electronic device (element 705). Keeping with the example keyboard of FIG. 6C, the keyboard may comprise two separate sets, or vertical rows, of keys. As long as no keys in the two sets of keys are manipulated, the keyboard may continue monitoring for key movement (elements 710 and 705). Once a key is manipulated, or moved, the keyboard may continue by distinguishing the types of key movement. The keyboard may take different actions based on whether the key is being depressed by the user (element 715). If the key manipulation is depression or vertical key movement, which would be the case for the user desiring to generate a home row character, the keyboard may sense the key depression (element 725) and sense when the key has been pressed completely (element 730). For example, some embodiments may sense vertical key movement by the amount of pressure applied to the key (element 725) and not determine that the key has been pressed sufficiently for character generation until a certain amount of pressure has been applied (element 730).

Alternatively, the initial key manipulation may be some type of horizontal key movement, whereby the keyboard may sense that the user wants to generate a character that is not a home row character (element 720). For example, the user may simulate moving a finger to a key on another row by sliding a key up or down, which the keyboard may sense (element 720). After sensing the simulated position, the keyboard may then continue by sensing key depression (element 725) until it determines that the depression amounts to a keystroke (element 730).

Once the keyboard senses that the user has effectively generated a sufficient or complete depression of a key, the keyboard may generate a character based upon the key position when it was depressed (element 735) and transmit the character to the portable electronic device (element 740). While the keyboard transmits the character to the device, the user may release or remove pressure from the key. The keyboard may sense this release or removal of pressure and return the key to the home position (element 745). Provided the user is still using the device (element 750), the keyboard may continue by monitoring the sets of keys for additional manipulation (element 705).

One may note that the acts of generating a character (element 735) and transmitting the character to the device (element 740) may not exist in certain embodiments. For example, some embodiments may implement the keyboard as a simple combination of hardware and electronics that merely detects key manipulation and transmits such information to the electronic device. Software within the electronic device may then determine which character the user wants to generate, based upon the information. Additionally, one may note that in alternative embodiments sensing key movement (element 720) and sensing key depression (element 725) may not be needed. For example, the keys may be implemented as sliding contact switches, similar to sliding switch assembly 300 of FIG. 3A. Using such keys, sensing key manipulation may not be necessary. The keyboard may only need to detect complete key depression (element 730), which it may detect by contact closures in the various key positions.

Figure 8:
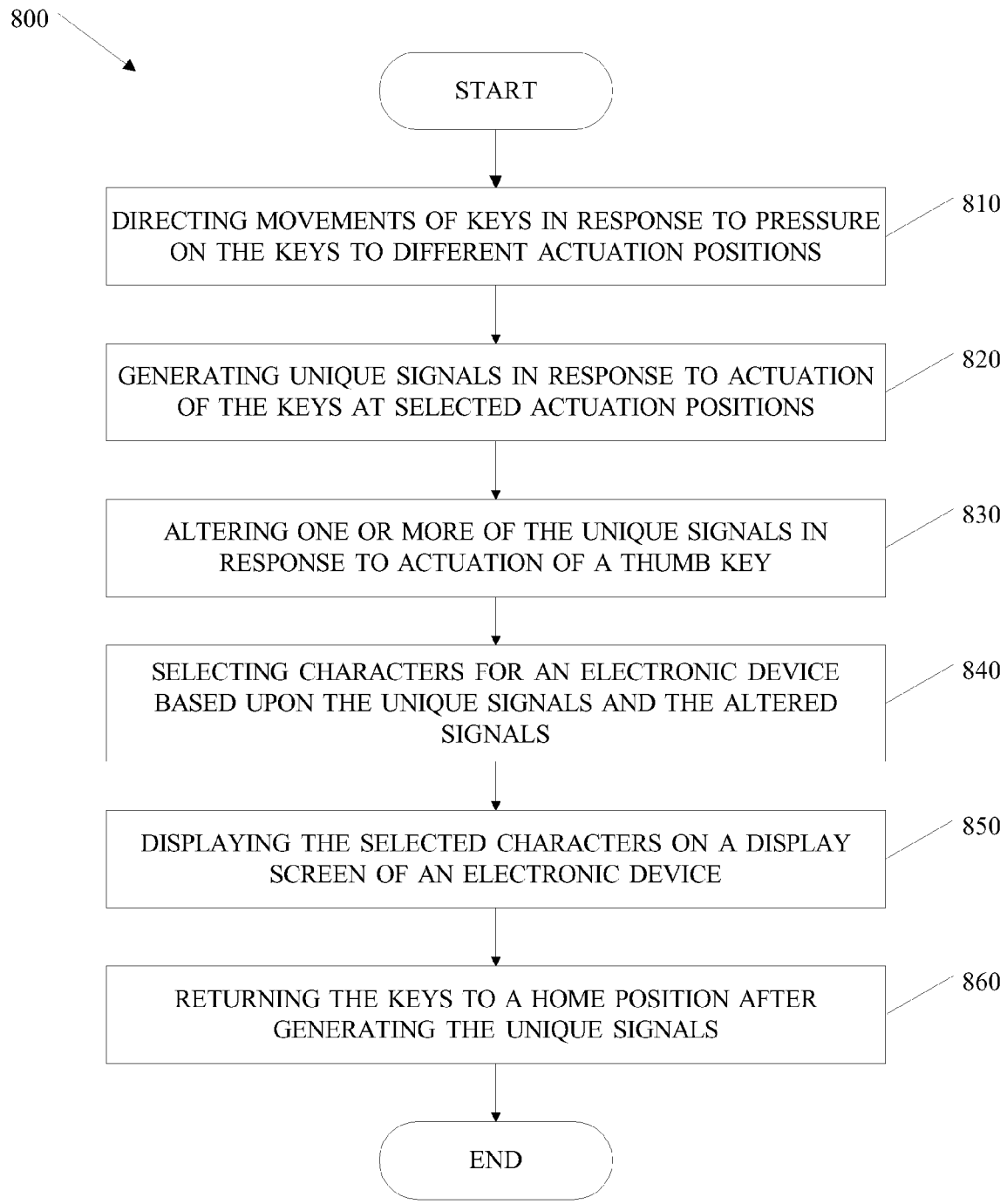
FIG. 8 shows an embodiment of a method flowchart for generating characters on an electronic device using a condensed keyboard.

Turning now to FIG. 8, FIG. 8 illustrates an embodiment of a method flowchart 800 for generating characters on an electronic device using a condensed keyboard. Flowchart 800 begins with directing movements of keys on the condensed keyboard to different actuation positions in response to pressure on the keys (element 810). For example, the condensed keyboard may comprise ten keys, having eight keys on a side facing away from a user operating the condensed keyboard and having two keys on a side facing the user. The eight keys may be manipulated by left and right hand fingers of the user while the two keys facing the user may be operated with thumbs of the user.

The arrangement of keys in the condensed keyboard may be manufactured such that the arrangement directs the movements of the keys when the user applies pressure to them (element 810). For example, the eight keys may comprise key heads coupled to structural members that activate different switches based upon the positions of the keys. That is to say that each individual key may slide in a channel and be actuated or depressed at one of several positions and generate multiple signals based upon where the key is activated (element 820). Directing key movements in this manner may allow an individual key to mimic the operation of a conventional full-sized keyboard and generate multiple characters.

Electronics within the electronic device may directly interpret the various signals generated in response to a user activating the keys and select characters based upon a default mapping (element 840). Alternatively, the user may have activated one of the thumb keys causing the electronic device to alter one or more of the signals generated by the condensed keyboard (element 830). Accordingly, the electronic device may interpret the altered signals and select characters from an alternate character map (element 840).

After selecting the characters from the unique signals and the altered signals, the electronic device may display the characters on a display screen coupled to the electronic device (element 850). Additionally, depending on the embodiment, the condensed keyboard arrangement may be configured to return the keys to home positions after generating the unique signals. For example, after moving, depressing, and releasing a key, the keyboard may force the key back to a center or neutral position using a spring or some other mechanisms.

Another embodiment of the invention is implemented as a program product for use within a keyboard, in accordance with, e.g., flowchart 700 as shown in FIGS. 7A and 7B. The program(s) of the program product defines functions of the embodiments (including the methods described herein) and can be contained on a variety of data and/or signal-bearing media. Illustrative data and/or signal-bearing media include, but are not limited to: (i) information permanently stored on non-writable storage media (e.g., read-only memory devices within the hard drive); and (ii) alterable information stored on writable storage media (e.g., magnetic media of a hard drive). Such data and/or signal-bearing media, when carrying microprocessor-readable instructions that direct the functions of the present invention, represent embodiments of the present invention.

In general, the routines executed to implement the embodiments of the invention, may be part of a keyboard operating system or a specific component, program, module, object, or sequence of instructions contained within memory of the keyboard. The microprocessor program of the present invention may be comprised of a multitude of instructions that will be translated by the microprocessor into a machine-readable format and hence executable instructions. Also, the programs may be comprised of variables and data structures that either reside locally to the program or are found in memory of the keyboard or the electronic device. In addition, various programs described hereinafter may be identified based upon the application for which they are implemented in a specific embodiment of the invention. However, it should be appreciated that any particular aforementioned program nomenclature is used merely for convenience, and thus the invention should not be limited to use solely in any specific application identified and/or implied by such nomenclature.

One skilled in the art of manufacturing electronic devices having keyboards for text and data entry will readily appreciate the flexibility and opportunities that the various embodiments described above afford the associated fields. These examples are only a few of the potential cases wherein the methods of generating characters for electronic devices, or machines and media that accomplish essentially the same, greatly improve the technology of compact keyboards for electronic devices.

It will be apparent to those skilled in the art having the benefit of this disclosure that the present invention contemplates methods, apparatuses, systems, and media for generating characters with condensed keyboards. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Further, embodiments may achieve multiple objectives but not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method to generate signals to select characters for a portable electronic device using a condensed keyboard, the method comprising:

directing movements of keys of a first set of keys and a second set of keys to selected positions in response to pressure on the keys, wherein the directing movements can comprise directing one or more of the keys into the selected positions of three or more actuation positions available for each of the keys located on one side of the portable electronic device, the one side arranged to be facing away from a user when the user is to operate the condensed keyboard, wherein the directed movements associated with the first set of keys are adapted to substantially mimic finger movements between keys by a right hand of the user and the directed movements associated with the second set of keys are adapted to substantially mimic finger movements between keys by a left hand of the user; and generating unique signals in response to actuation of each of the keys at the selected positions.

2. The method of claim 1, further comprising generating a thumb signal in response to actuation of a thumb key, wherein the thumb key is located on a front side of the portable electronic device, the front side arranged to be facing the user when the user operates the condensed keyboard.

3. The method of claim 2, wherein generating a thumb signal comprises generating a signal to select a "space" character.

4. The method of claim 1, further comprising altering one or more of the unique signals in response to actuation of a thumb key.

5. The method of claim 1, further comprising displaying visual cues on a display screen of the portable electronic device to help the user determine which keys to actuate to select desired characters.

6. The method of claim 1, further comprising returning at least one key of the first set of keys to a home position after depressing the at least one key.

* * * * *